(No Model.)
J., W. J. & J. C. BEAL.
DRAFT EQUALIZER.
No. 359,661. Patented Mar. 22, 1887.
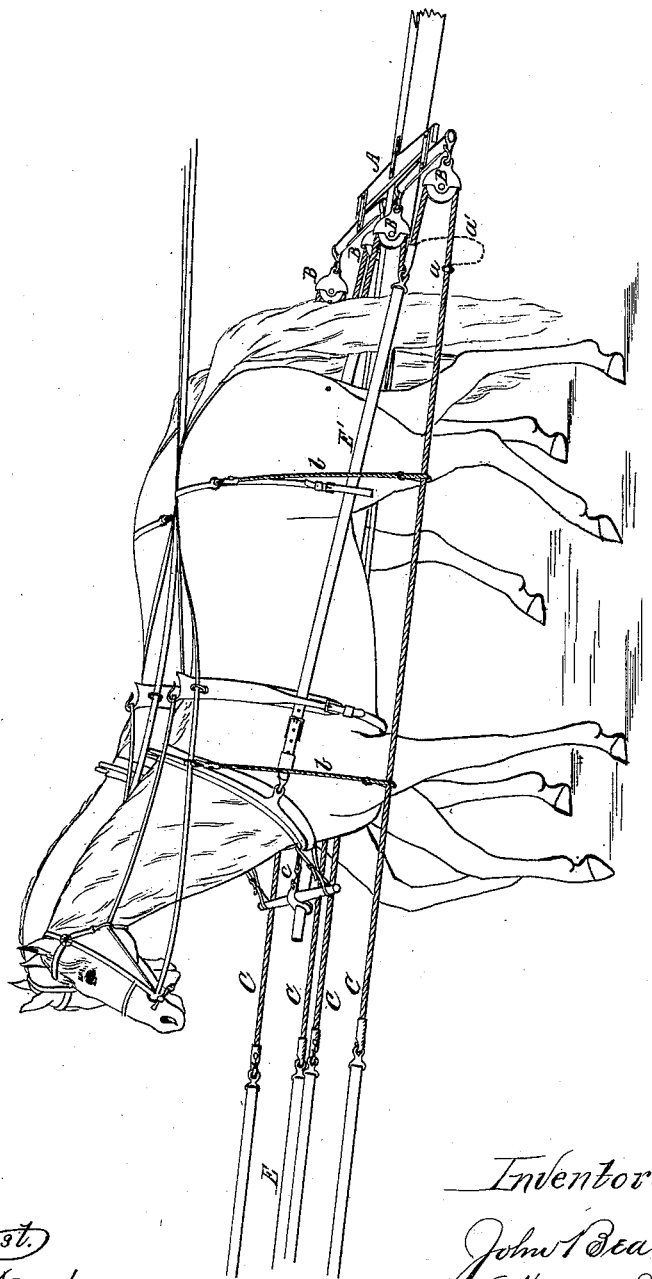

UNITED STATES PATENT OFFICE.

JOHN BEAL, WILLIAM J. BEAL, AND JESSE C. BEAL, OF BRUCE, BENTON COUNTY, IOWA.

DRAFT-EQUALIZER.

SPECIFICATION forming part of Letters Patent No. 359,661, dated March 22, 1887.

Application filed November 15, 1886. Serial No. 218,980. (No model.)

*To all whom it may concern:*

Be it known that we, JOHN BEAL, WILLIAM J. BEAL, and JESSE C. BEAL, citizens of the United States, residing at Bruce township, in the county of Benton and State of Iowa, have invented certain new and useful Improvements in Draft-Equalizers, of which the following is a specification.

The object of our invention is to equalize the draft of the respective spans of horses in a four-horse team; and the invention is fully described in the following specification, and illustrated in the accompanying drawing.

The drawing represents the invention as applied to a team and vehicle-pole, the rear span only being shown.

In the usual manner of hitching a four-horse team to a vehicle or other thing to be drawn when the horses are arranged in spans tandem, it is almost impossible to secure an equal draft on the part of each span, since both are attached independently, and the slackening of the tugs of either brings all the draft upon the other span.

Our invention is designed to remedy this common difficulty by such a construction as will admit of a considerable backward or forward movement on the part of either team without producing any inequality in the draft. This we accomplish by the following simple device.

To the hooks of a common pair of whiffletrees, A, are attached four sheaves, B B B B, mounted in a suitable block, and over each sheave runs a rope, C. A chain or other equivalent device may be used; but the rope is preferred. Each end of the ropes is provided with a snap-hook, and one or both of these may be so attached as to admit of adjustment in the length of the ropes, if desired. These hooks at the ends of the ropes engage with the cockeyes of the tugs E and E', respectively. It will be evident, now, that the draft upon the respective tugs is uniform, and that the arrangement of parts is such as to allow considerable forward or backward movement of either span of horses without disturbing this equality of draft. It is of course necessary that there should be some limit to the diverse movements of the spans, and this is effected by providing the ropes with suitable stops, which engage with the sheave-block at each extreme of movement. The hook at one end of the rope may serve for one of these stops, and the other may be a fixed or adjustable stop, $a$, attached to the rope. An equivalent device is the cord $a'$. (Indicated by the dotted line.)

The ropes are suspended from the harness, each side of the horse, by cords or straps $b$ $b$, looped at the lower end and connecting with rings in the hames and breeching by suitable snaps. These may be made adjustable by means of buckles or other common device. The loops allow free movement of the rope-tug back and forth, while the snap at the other extremity admits of the whole device being quickly and easily disconnected from the harness. In practice we coat the ropes with paint or other suitable material, to protect them from the weather.

When the equalizer is used in connection with a wagon-tongue, it becomes necessary to arrange the neck-yoke so that the backward and forward movement of the horses shall not disengage the neck-yoke and tongue. This we do by providing the neck-yoke and tongue, respectively, with loops or eyes, into which is fastened by snaps a connecting-strap, $c$. This manner of connecting the neck-yoke and tongue is not claimed to be altogether new, but is shown as a necessary feature of the invention when applied to a wagon or other vehicle tongue.

Besides the advantages which have already been mentioned, it will be seen that the device is an improvement over the common mode of attachment, as it dispenses with the forward set of whiffletrees, whose weight and tendency to drag and swing is a common annoyance. The invention is equally applicable to a two-horse team driven tandem.

We are aware that a device designed to equalize the draft of four horses arranged as shown in this application has hitherto been made, and we do not therefore make a broad claim to such equalization of draft; but we regard our invention as a substantial improvement over such prior invention for the following reasons: In the device referred to the equalization is effected by attaching one tug of a lead-horse to one end of a single-tree, and a corresponding tug of a wheel-horse to the same end of another single-tree mounted on the same evener, the opposite tugs of the respective horses being attached to the other ends of the single-trees in inverse order. The single-trees are set one above and one below the evener, and the lead-tugs pass through loops or holes in the neck-yoke. One improvement, which will be obvious, is the adaptability of our invention to any set of whiffletrees, while the device mentioned must of necessity have a special set of whiffletrees for each set of tugs. Another is the greater facility with which our device may be connected with and disconnected from the whiffletrees. Our device also admits of a greater backward and forward movement on the part of the respective spans. It further admits of a draft which is equal, and in the same line on both sides of the collar, while that of the former device is in different lines, producing disagreeable and injurious effects upon the horse's shoulders. Still another important advantage possessed by our device is that it allows the neck-yoke to be brought close up to the necks of the wheel-horses, without which it is impossible to control the vehicle or machine pole on rough ground, while by the passage through it of the lead-tugs in the former device the neck-yoke must be depressed to the lower line made by these tugs, or else such lead-tugs must draw out of a direct line. In the one case the wheel-horses lose control of the pole, and in the other there is a downward draft upon the necks of the wheelers, and altogether too high a hitch, relatively speaking, for the lead-team. Other advantages might be mentioned, but these are regarded as the most important.

Having thus described our invention, what we claim as new, and desire to secure by Letters Patent, is—

1. In a draft-equalizer, the combination of the tug-ropes C C C C, adapted to be connected at one end with the harness-tugs of the lead-team, and at the other with the tugs of the rear team, and the sheaves B B B B, adapted to connect with the whiffletrees A, substantially as and for the purpose set forth.

2. In a draft-equalizer, the combination of the tug-ropes C C C C, the tugs E E', the supporting cords or straps b b, the sheaves B B B B, and the whiffletrees A, all substantially as set forth.

3. In a four draft-equalizer of the kind specified, the tug-ropes C C C C, having the snap-hooks at the rear end adapted to act as one stop, and the collar or button a on the other side of the sheave to serve as the other stop, or equivalent means for limiting the backward and forward movement of the tug, substantially as specified.

4. In a draft-equalizer, the combination of the draft apparatus A, B B B B, C C C C, and E E', substantially as specified, and the neck-yoke attached to the vehicle-pole by the strap c, substantially as and for the purpose set forth.

In testimony whereof we affix our signatures in presence of two witnesses.

JOHN BEAL.
    WILLIAM J. BEAL.
    JESSE C. BEAL.

Witnesses:
 W. A. STEBBINS,
 H. E. STEBBINS.